United States Patent

[11] 3,524,387

| [72] | Inventor | Lev Nikolaevich Britvin<br>ulitsa Dybenko, 12, kv.51, Moscow, U.S.S.R. |
|---|---|---|
| [21] | Appl. No. | 735,302 |
| [22] | Filed | June 7, 1968 |
| [45] | Patented | Aug. 18, 1970 |

[54] CAPACITY REGULATOR FOR INTERMITTENT-ACTION DISPLACEMENT PUMP
4 Claims, 14 Drawing Figs.

[52] U.S. Cl. .................................................. 92/60,
 92/80, 92/82, 103/37, 230/21
[51] Int. Cl. .................................................. F01b 31/14,
 F04b 49/08
[50] Field of Search .................................... 92/60, 59,
 82, 80; 230/21; 103/37

[56] References Cited
UNITED STATES PATENTS

| 2,032,429 | 3/1936 | Metzgar | 230/21X |
| 2,261,911 | 11/1941 | Condit | 230/21 |
| 2,711,697 | 6/1955 | Gibbs | 230/21X |
| 3,159,330 | 12/1964 | Boldt | 230/21X |
| 3,314,594 | 4/1969 | Rietdijk | 230/21 |

*Primary Examiner*— Martin P. Schwadron
*Assistant Examiner*— Leslie J. Payne
*Attorney*— Waters, Roditi, Schwartz & Nissen ABSTRACT: A capacity regulator for intermittent-action displacement pumps comprises a housing forming a regulator chamber in which an elastic diaphragm is located to provide a variable-volume chamber between the diaphragm and the housing. A second elastic diaphragm is likewise located in the housing so as to form an auxiliary chamber with the other elastic diaphragm which can be filled with a liquid hermetically sealed by the diaphragms. A pressure-head chamber is formed in the housing by the second elastic diaphragm at the side opposite the variable-volume chamber and fixed thrust elements are located in the regulator chamber and limit the displacement of the diaphragms so that one of the diaphragms comes to bear on one of the thrust elements in one direction of movement while the other diaphragm comes to bear on the second of the elements in the opposite direction of movement. The auxiliary chamber is hydraulically connected with a control mechanism in turn communicating with a source of pressure.

Patented Aug. 18, 1970 3,524,387

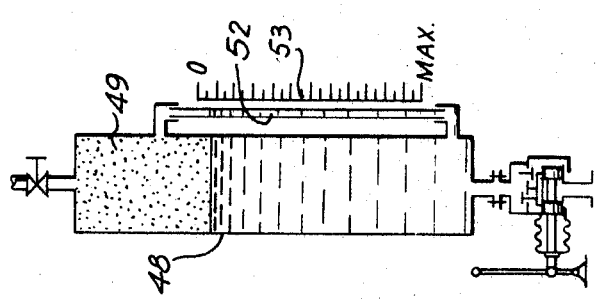
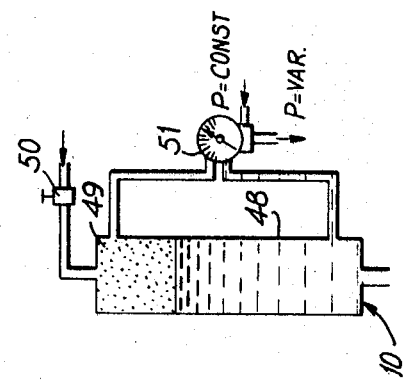
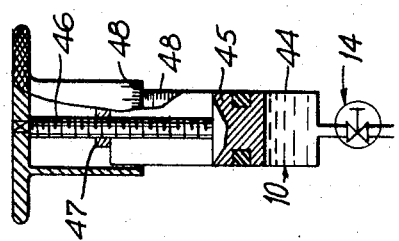
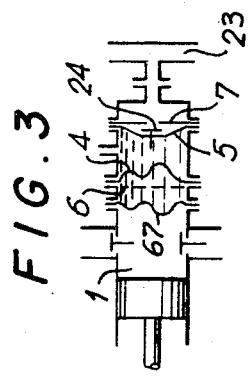
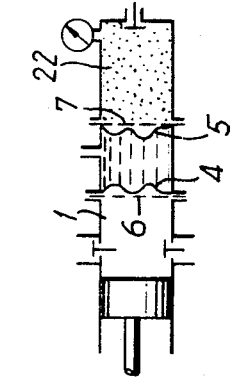
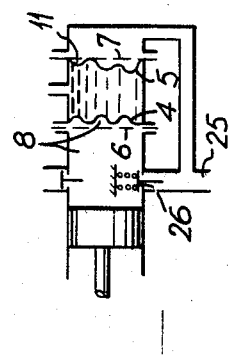
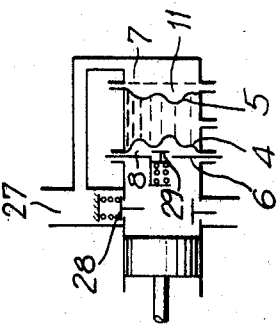

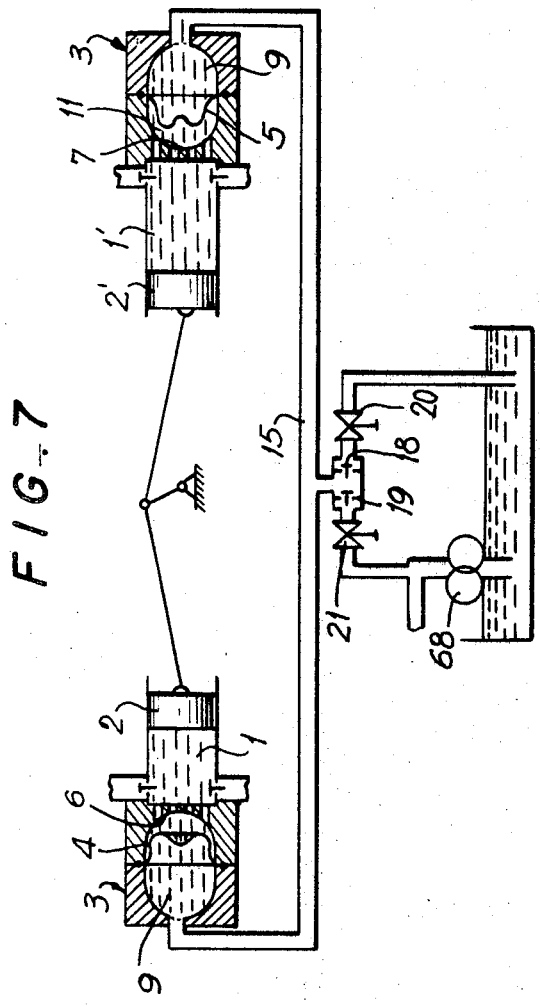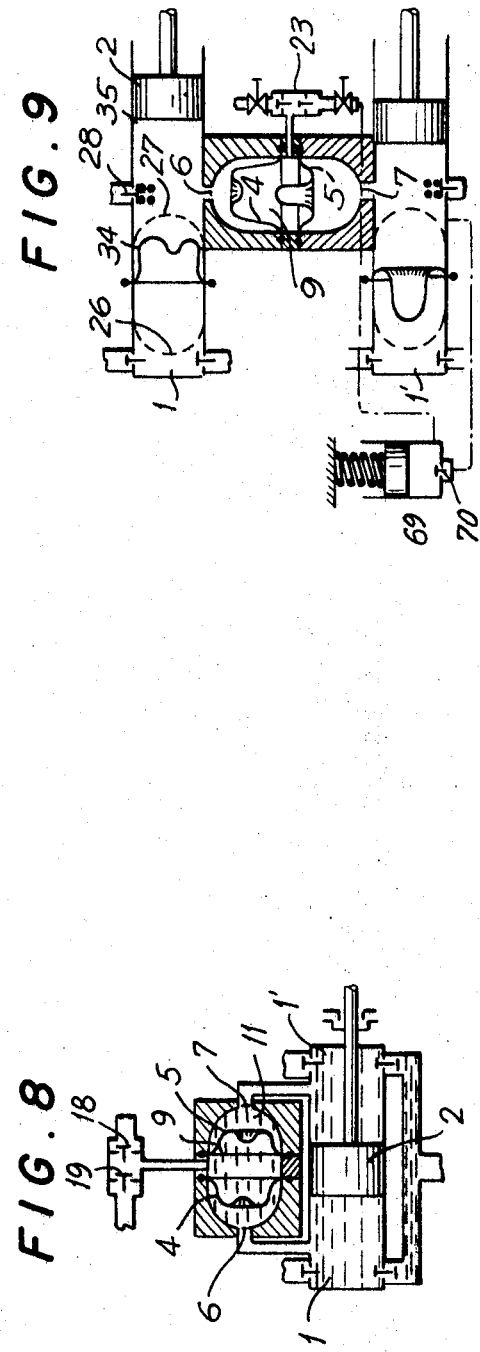

CAPACITY REGULATOR FOR INTERMITTENT-ACTION DISPLACEMENT PUMP

The present invention relates to hydraulic machines and more specifically it relates to the capacity regulators of intermittent-action displacement pumps, mainly liquid-handling pumps.

Known in the art is a capacity regulator for an intermittent-action displacement pump, mainly a liquid-handling pump, having a control mechanism and movable elements in its chamber, one of said elements forming a common chamber of variable volume, together with the pump working chamber while at least two movable elements form an auxiliary chamber filled with liquid.

A disadvantage of the aforesaid regulator lies in that it fails to ensure complete sealing of the auxiliary chamber and, consequently, reliable functioning of the regulator during prolonged service. Another disadvantage of the said regulator consists in that it requires the use of additional intermediate servo mechanisms in case of remote and automatic control.

To ensure a high accuracy of liquid metering, the regulator has to be calibrated preliminarily, which is still another disadvantage.

An object of this invention resides in providing a device which can seal off completely the auxiliary chamber.

Another object resides in simplifying the remote and automatic control of the pump capacity.

An object of this invention also resides in improving the accuracy of metering the liquid handled by the pump.

In compliance with these and other objects the invention contemplates a capacity regulator for displacement pumps wherein, the movable elements are made in the form of elastic diaphragms which hermetically seal the auxiliary chamber and are so located in the regulator chamber that one of the diaphragms forming the auxiliary chamber separates a pressure head chamber in the regulator chamber, opposite the variable-volume chamber. The motion of the diaphragms forming the auxiliary chamber is limited by stationary fixing thrust elements so that one diaphragm rests on said fixing thrust element on the suction stroke and the other one on the delivery stroke. To change the quantity of liquid in the auxiliary chamber, the latter is connected hydraulically with the control mechanism which is in communication with the source of pressure.

It is practicable to design the capacity regulator in such a way that the pressure head chamber is in communication with the source of pressure head which is higher than that in the variable-volume chamber while the latter is being filled with the handled liquid.

The source of pressure head for the regulator may be constituted by the ambient medium.

It is practicable to communicate the pressure head chamber hydraulically with the suction line of the pump and to insert a throttle valve between the variable-volume chamber and the suction line.

It is also practicable to communicate the pressure head chamber with the delivery line of the pump and to insert a throttle valve between the variable-volume chamber and the delivery line.

In pumps having two working chambers with the operating cycle displaced by 180° each of the two chambers alternately forms a part of the variable-volume chamber or is put in communication with the pressure head chamber of the regulator.

It is practicable to install one of the fixed thrust elements in the variable-volume chamber and the other in the pressure head chamber.

In some cases it is practicable to install the fixed thrust elements in the auxiliary chamber.

It is practicable to provide the control mechanism with a source of pressure communicating with the auxiliary chamber via a bypass mechanism and building up a pressure exceeding that in the pressure head chamber.

It is practicable to make the control mechanism in the form of a sealed hydraulic cylinder with one of its working chambers communicating with the regulator auxiliary chamber via a channel located partly in the fixed thrust element.

It is also practicable to provide the control mechanism with a calibrated vessel with a variable liquid level, this vessel communicating with the auxiliary chamber via a bypass mechanism, the volume of the calibrated vessel being equal to or larger than the volume of liquid displaced by the pump piston within one working stroke.

Given below is a detailed description of an embodiment of the present invention with reference to the accompanying drawings in which:

FIG. 2 shows a second embodiment of the connection between a pressure head chamber and a source of pressure head;

FIG. 3 shows a third embodiment thereof;

FIG. 4 shows a fourth embodiment thereof;

FIG. 5 shows a fifth embodiment thereof;

FIG. 7 shows a layout of connections between a capacity regulator and a pump with two working chambers, according to a first modification;

FIG. 8 shows a second modification thereof;

FIG. 9 shows a third modification thereof;

FIG. 11 shows a control mechanism with a calibrated vessel;

FIG. 12 shows a calibrated vessel with a level pickup;

FIG. 13 shows a calibrated vessel with a bypass mechanism; and

Figure 1:
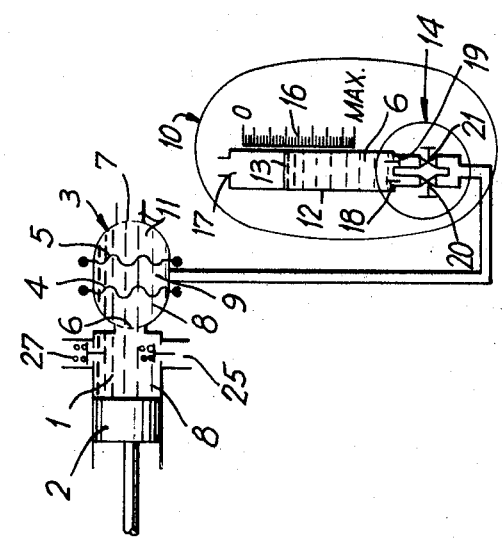
FIG. 1 illustrates a capacity regulator for displacement pumps according to the invention, general view.

For regulating the capacity of a displacement pump, the capacity regulator is connected to the pump working chamber 1 (FIG. 1) which accommodates a piston 2.

The capacity regulator consists of a chamber 3 accommodating elastic diaphragms 4 and 5. The displacement of the diaphragms 4 and 5 is limited in the chamber 3 by fixed thrust elements 6 and 7. The thrust element 6 limits the displacement of the diaphragm 4 on the suction stroke whereas the thrust element 7 limits the displacement of the diaphragm 5 on the delivery stroke. The thrust elements 6 and 7 are made in the form of perforated plates.

A part of the regulator chamber 3 limited by the diaphragm 4 together with the pump working chamber 1 form a variable-volume chamber 8.

A part of the regulator chamber 3 enclosed between the diaphragms 4 and 5 forms an auxiliary chamber 9. For changing the amount of liquid in the auxiliary chamber 9, said chamber is connected hydraulically with a control mechanism 10 which communicates with a source of pressure (omitted in the drawing).

A part of the regulator chamber 3 limited by the diaphragm 5 forms a pressure head chamber 11 which communicates with a source of pressure head.

The auxiliary chamber 9 is sealed off from the variable-volume chamber 8 and the pressure head chamber 11.

The control mechanism 10 is provided with a calibrated vessel 12 with a varying liquid level 13, said vessel communicating with the auxiliary chamber 9 via a bypass mechanism 14 and pipe 15. The calibrated vessel 12 has a scale 16 for reading off the pump capacity.

The chamber 17 of the calibrated vessel 12 located above the liquid level 13 is in communication with the source of pressure. The pressure fed to the chamber 17 is higher than that in the pressure head chamber 11.

The bypass mechanism 14 consists of valves 18 and 19 and cocks 20 and 21.

The pressure head chamber 11 is connected to the source of pressure head which is higher than that in the variable-volume chamber 8 while the latter is being filled with the handled liquid.

The source of pressure head is either the atmosphere or the ambient medium the pump is operated in.

In the second embodiment of the invention, the source of pressure head is constituted by a sealed vessel 22 (FIG. 2) containing gas under pressure higher than that in the variable-volume chamber 8 while the latter is being filled with the handled liquid.

The thrust element 7 is made in the form of a perforated plate with holes of a considerably smaller diameter than those in the thrust element 6, which makes it possible to use the perforated plates as thrust elements at high operating pressures.

In the third embodiment of the invention the source of pressure head is formed by a gas or liquid in the pipeline 23 (FIG. 3). The pipeline 23 can be a water supply line or any other line.

The thrust element 7 has a hole closed with a valve 24 which is connected to the diaphragm 5.

The thrust element 6 can be made analogous to the thrust element used in the second embodiment of the regulator.

In the fourth embodiment, the pressure head chamber 11 is connected hydraulically to a suction line 25 (FIG. 4). In this case there is a throttle valve 26 installed between the suction line 25 and the variable-volume chamber 8.

This throttle valve creates a pressure difference between the variable-volume chamber 8 and the auxiliary chamber 9 required for the displacement of the diaphragms 4, 5 on the suction stroke.

In the 5th embodiment, the pressure head chamber 11 is connected hydraulically to a delivery line 27 (FIG. 5). In this design there is a throttle valve 28 installed between the variable-volume chamber 8 and delivery line 27 and serving for displacing the diaphragms 4 and 5 on the delivery stroke. The thrust element 6 has a hole which is closed with a normally-open valve 29.

Figure 6:
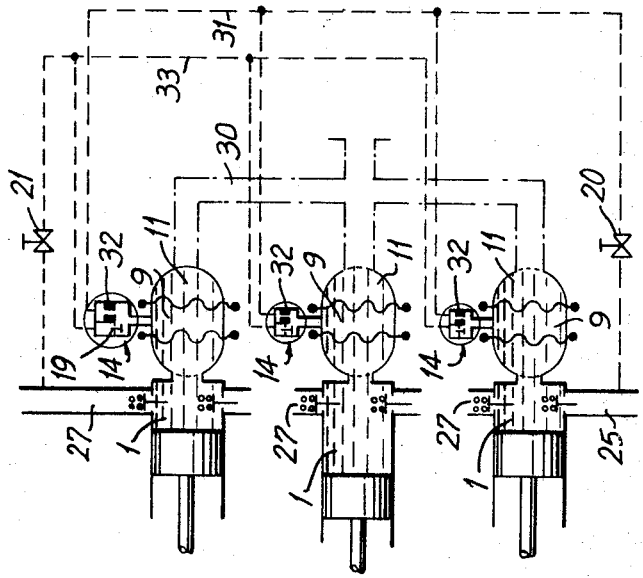
FIG. 6 shows a layout of connections between a capacity regulator and a multicylinder pump.

In a multicylinder pump the pressure head chambers 11 (FIG. 6) of the regulators are interconnected by a pipe 30 which communicates with the source of pressure head.

The auxiliary chambers 9 are connected by the bypass mechanism 14 to one another and with the source of pressure.

The mutual connection of the auxiliary chambers 9 is ensured by the hydraulic line 31 via throttles 32 which offer a constant hydraulic resistance.

The source of pressure is constituted by the delivery line 27 of the pump, connected to the auxiliary chambers 9 by the cock 21 through a common hydraulic line 33.

For the pump, having two operating chambers 1 and 1'(FIGS. 7, 8, 9) with the chambers operating on a displaced operating cycle, mostly by 180°, the part of the chamber 3 limited by the diaphragm 4 is connected hydraulically with one working chamber of the pump while the part of the chamber 3 limited by the diaphragm 5 is connected to the other working chamber. Each working chamber is alternately either a part of the variable-volume chamber 8 or is put in communication with the regulator pressure head chamber 11.

In the pumps with the piston 2 separated from the working chamber 1 by a diaphragm 34 (FIG. 9) the regulator is connected hydraulically to the space 35 formed by the piston 2 and separating diaphragm 34.

Figure 10:
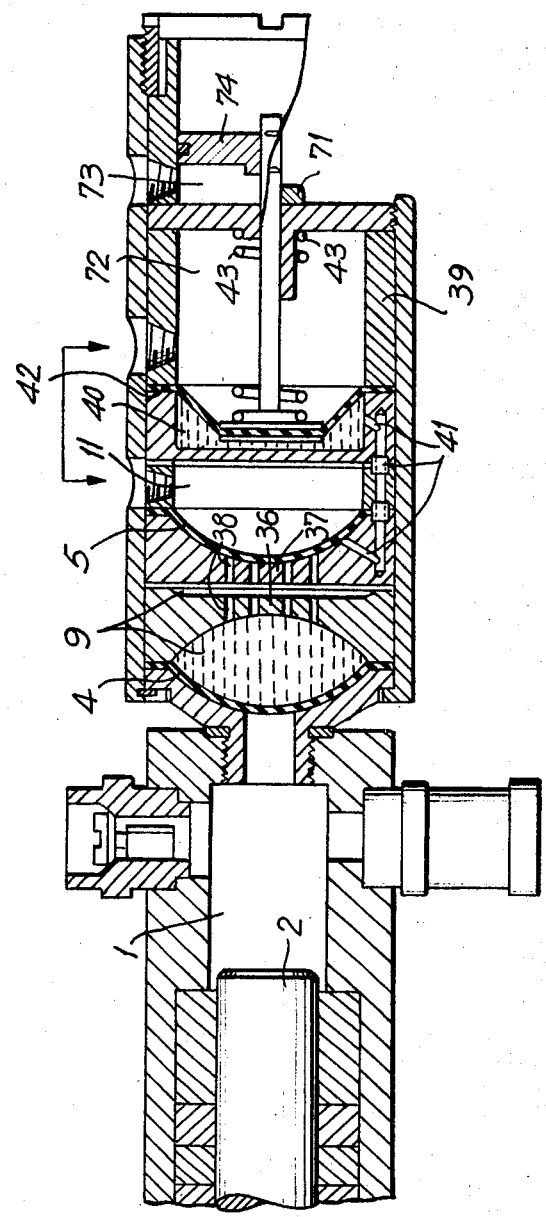
FIG. 10 shows a regulator in which the fixed thrust elements are located in an auxiliary chamber.

When the thrust elements 36 and 37 (FIG. 10) are located in the auxiliary chamber 9, the thrust element 36 limits the displacement of the diaphragm 4 on the delivery stroke whereas the thrust element 37 limits the displacement of the diaphragm 5 on the suction stroke. The thrust elements 36 and 37 have bypass channels 38.

The control mechanism is provided with a hydraulic cylinder 39 whose working chamber 40 is connected by a channel 41 with the auxiliary chamber 9. A part of the channel 41 is located in the fixed thrust element 37 opening on its supporting surface. The liquid contained in the working chamber 40 is separated by a diaphragm 42 loaded by a spring 43.

The volume of liquid in the chamber 40 and, correspondingly, in the auxiliary chamber 9 is changed by changing the position of the diaphragm 42.

The control mechanism 10 has a calibrated vessel with a varying liquid level, this vessel having the form of a cylinder 44 (FIG. 11) with a piston 45 sliding inside. In case of manual control of the regulator the piston 45 is moved by means of a screw 46 and nut 47. To determine the pump capacity, the control mechanism 10 is provided with a scale 48. The cylinder 44 is connected to the auxiliary chamber 9 by the bypass mechanism 14.

The calibrated vessel 12 of the control mechanism 10 can be made in the form of a cylinder 48 (FIG. 12) with a varying liquid level. The space 49 above the liquid communicates with the source of pressure through a reducer 50. To determine the pump capacity, the control mechanism 10 is provided with a differential pressure gauge 51 whose scale reading or the pressure of the output pneumatic signal are proportional to the liquid level in the cylinder 48, and, consequently, to the capacity of the pump.

At high pressures in the space 49, when the cylinder 48 (FIG. 13) is made from nontransparent materials, the liquid level in the cylinder 48 can be determined by using a transparent tube 52 with a scale 53, installed on said cylinder. The upper end of the small-diameter tube 52 communicates with the space 49 while its lower end communicates with the liquid in the lower part of the cylinder.

The angle of inclination of the tube 52 to the axis of the cylinder 48 is selected to suit the required accuracy of metering of the liquid handled by the pump.

When several intermittent-action displacement pumps are combined by a common sequence of operations and their feed has to be regulated at an unchanged ratio of the handled components, a special apparatus is used which interconnects the calibrated vessels of the regulators of said pumps.

This apparatus has a rectilinear horizontal rack 54 (FIG. 14) passing through zero divisions of the scales of the vertically-mounted calibrated vessels 55, 56, 57, 58, 59. Installed on the rack 54 are slides 60, 61, 62, 63 corresponding to each calibrated vessel.

The calibrated vessel 56 with the lowest liquid level is provided with a slide 64 moving along this vessel. The slide 64 is set at the liquid level in this vessel. The slides 60, 61, 63 of the rack 54 are connected to the slide 64 and are installed in such a manner that the liquid levels in the corresponding calibrated vessels are located on a straight line connecting the slide 64 with the corresponding rack slide. If the apparatus comprises a second vessel 57 whose liquid level is close to the lowest level in the calibrated vessel 56 provided with the slide 64, this level is then connected to the third calibrated vessel 59 whose level is located considerably higher than that in the calibrated vessel 56. For this purpose the third calibrated vessel 59 is provided with an additional slide 65 connected to the corresponding rack slide 62.

The changes in the levels in the calibrated vessel 59 are automatically followed by a photocell 66 which moves together with the slide 65 and sends commands for turning the bypass mechanism 14 on or off.

The capacity regulator for the displacement pump functions as follows.

As the piston 2 (FIG. 1) starts on its delivery stroke, the liquid is forced from the working chamber 1 into the chamber 3 formed by the regulator diaphragm 4. The diaphragms 4 and 5 move simultaneously towards the fixed thrust element 7.

At the moment when the diaphragm 5 comes to bear on the thrust element 7, the liquid stops flowing from the working chamber 1 into the chamber 3, the pressure in the working chamber 1 and chamber 3 rises up to the value of the pressure in the delivery line 27 and the liquid is forced from the working chamber 1 into the delivery line 27 of the pump.

When the piston 2 moves on its suction stroke, the diaphragms 4 and 5 start moving simultaneously away from the thrust element 7 towards the thrust element 6 under the effect of the pressure in the pressure head chamber 11 and the liquid flows from the chamber 3 limited by the diaphragm 4 into the working chamber 1.

When the diaphragm 4 comes to rest on the thrust element 6, the pressure in the working chamber 1 drops up to the pressure existing in the suction line 25 and the working chamber 1 starts being filled with the liquid.

The capacity of the pump can be changed by changing the volume of liquid in the auxiliary chamber 9. When the chamber 9 is filled with liquid so that the diaphragm 4 rests on the thrust element 6 and the diaphragm 5 rests on the thrust element 7, the liquid will be forced from the working chamber 1 into the delivery line 27 from the very beginning of the delivery stroke of the piston 2. In this case the pump will develop a maximum capacity.

As the amount of liquid in the auxiliary chamber 9 diminishes by a value of $\Delta V$, the volume of liquid forced into the delivery line 27 during one working cycle will also diminish by the same value of $\Delta V$. If $\Delta V = V_{w.c.} = F_p S_p$, where $V_{w.c.}$ is the volume of the working chamber, $F_p$ is the piston area and $S_p$ is the piston stroke, the pump capacity will be equal to zero.

The volume of liquid in the auxiliary chamber 9 is changed by the control mechanism 10.

As the cock 20 is opened, the liquid flows from the auxiliary chamber 9 under the effect of the delivery pressure through the valve 18 into the calibrated vessel 12. In this case the volume of liquid $\Delta V$ discharged from the auxiliary chamber 9 is determined by the height of the level 13.

The valve 18 prevents the liquid from flowing from the calibrated vessel 12 back into the auxiliary chamber 9 on the suction stroke. The cock 20 should be closed as soon as the required capacity of the pump is reached.

To increase the pump capacity, the cock 21 is opened. Then the liquid will flow from the calibrated vessel 12 under the effect of gas pressure in the chamber 17 and enter the auxiliary chamber 9 on the pump suction stroke. The valve 19 keeps the liquid from flowing from the auxiliary chamber 9 back into the calibrated vessel 12 on the delivery stroke.

When the pump handles heavy and contaminated or very aggressive liquid, the variable-volume chamber 8 is provided with a separating diaphragm 67 installed between the working chamber 1 (FIG. 3) and the thrust element 6 and made from, say, fluoroplastic film. The space between the diaphragms 67 and 4 is filled with a certain constant amount of neutral liquid.

In the case when the pressure head chamber 11 (FIG. 4) communicates with the suction line 25, the diaphragms 4 and 5 are displaced towards the thrust element 6 on the suction stroke under the effect of the pressure difference originated on the valve 26.

When the pressure head chamber 11 (FIG. 5) communicates with the delivery line 27, the diaphragms 4 and 5 are moved to the thrust element 7 on the delivery stroke under the effect of the pressure difference originated on the valve 28.

For a pump with two working chambers whose working cycles are displaced by 180° the diaphragm 4 (FIG. 7) is moved towards the thrust element 6 on the suction stroke of the working chamber 1 by the liquid forced from the working chamber 1' into the chamber 3 limited by the diaphragm 5. Conversely, on the suction stroke of the working chamber 1' the diaphragm 5 is moved towards the thrust element 7 by the liquid forced from the working chamber 1 on the delivery stroke of the piston 2.

The liquid volume in the auxiliary chamber 9 is changed by the external hydraulic system using the pump 68 as a source of pressure.

If there is no pump 68, the source of control pressure is constituted by the hydraulic accumulator 69 (FIG. 9) connected to the chamber 35 via a valve 70.

When the fixed thrust elements 36 and 37 (FIG. 10) are located in the auxiliary chamber 9, the pump capacity increases when the amount of liquid diminishes in the auxiliary chamber 9. A maximum capacity is reached when both diaphragms 4 and 5 rest simultaneously on their respective thrust elements 36 and 37.

The amount of liquid in the auxiliary chamber 9 is changed due to changes in the position of the diaphragm 42. The position of the diaphragm 42 can be changed by a number of ways. In case of manual control its position is changed by a nut 71. In case of remote or automatic control its position is changed as a rule by the air fed at a certain pressure into a chamber 72 or 73 of the pneumatic cylinder whose piston 74 is connected to the diaphragm 42.

The diaphragm 42 will remain in equilibrium when the following conditions are observed:

$$P_{11} f_{ef42} = F_{spr} + P_{72} f_{ef42}$$

or $$P_{11} f_{ef42} = F_{spr} + P_{72} f_{ef42} - P_{74} f_{74}$$

where $P_{11}$, $P_{72}$, $P_{74}$ is the pressure of air in the chambers 11, 72 and 74, respectively; $f_{ef42}$, $f_{74}$ are the effective areas of the diaphragm 42 and piston 74, respectively; $F_{spr}$ is the force of the spring 43 applied to the diaphragm 42.

As a rule, $P_{11} = P_{72}$.

From the above equations it can be concluded that the pump capacity can be changed when:
1. $P_{11} = $ var and $P_{72} = $ const, $F_{spr} = $ const
2. $P_{72} = $ var and $P_{11} = $ const, $F_{spr} = $ const
3. $F_{spr} = $ var and $P_{11} = $ const, $P_{72} = $ const
4. $P_{74} = $ var and $P_{11} = $ const, $P_{72} = $ const, $F_{spr} = $ const The pressure in the working chamber 1 on the suction stroke does not exert any influence upon the position of equilibrium of the diaphragms 42 since the channel 41 is covered by the diaphragm 5 which cuts off the working chamber 1 from the chamber 40.

Thus, the pump capacity does not depend on the pressure changes at the pump inlet.

When the capacity regulator is used with pumps intended for metering the handled liquid, the calibrated vessels are provided with scales 48 (FIG. 11), 51 (FIG. 12) and 53 (FIG. 13). When the amount of liquid is determined in the auxiliary chamber 9 by the free level of liquid, the tube 52 may be arranged at an angle to the calibrated vessel. This will ensure a higher accuracy in determining the position of the level and, consequently, the capacity of the pump.

If necessary, the calibrated vessels 12 (FIG. 1) can be mounted by means of pipes 15 on a panel installed remotely from the pump.

This allows the capacity of several pumps to be controlled from one control panel, when these pumps operate in one and the same flow line.

Figure 14:
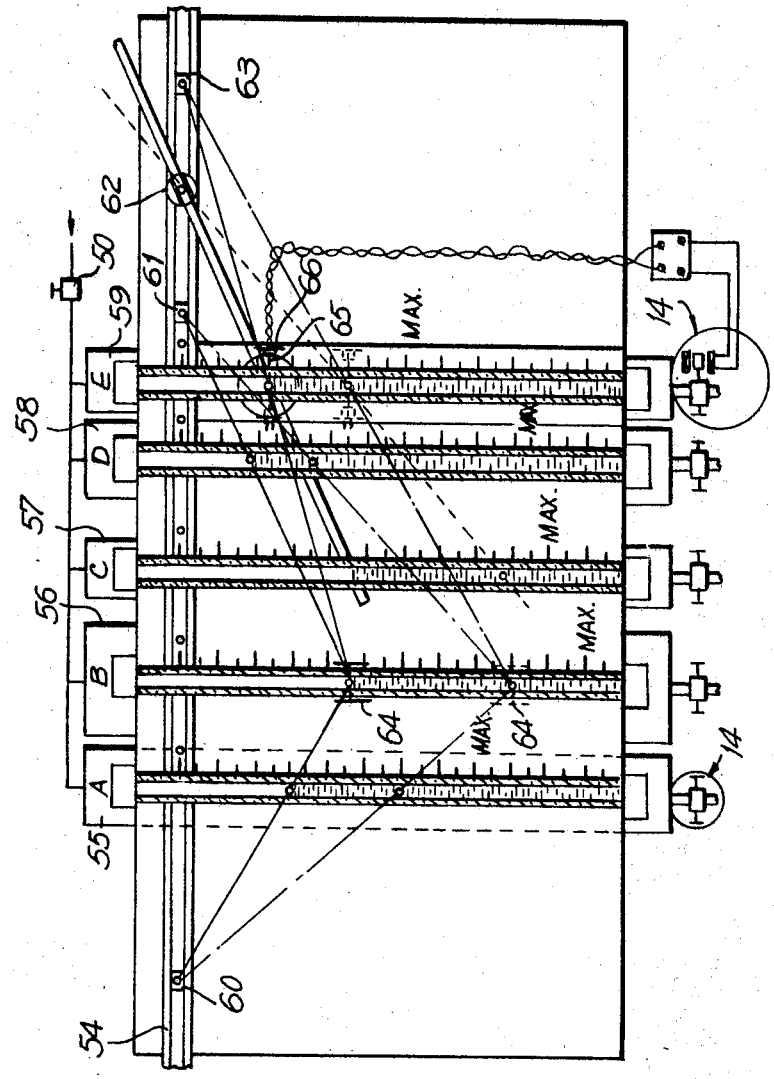
FIG. 14 shows a capacity regulator for a number of pumps serving for the same sequence of operations.

In such instances sometimes the control of the sequence of operations calls for a simultaneous change in the capacity of all the pumps, at the same time retaining the existing proportions between the quantities of the delivered components A,B,C,D,E (FIG. 14).

The delivery of each component is determined by the position of the liquid level in the respective calibrated vessels 55, 56, 57, 58, 59.

When the pump capacity is changed without changing the existing proportions between the components, the slide 64 is shifted upwards to reduce the delivery of all the pumps or downwards when the delivery of all the pumps has to be increased.

Shown by dotted lines in FIG. 14 is the position of the slide 64 which it must occupy when the capacity of all the pumps has to be increased twice.

In this case the points of intersection of the axes of the calibrated vessels 55, 58, 59 with the elements connecting the respective slides 60, 61, 63 with the slide 64 will determine the positions to which the liquid levels in the calibrated vessels have to be brought by means of the bypass mechanism 14.

If it is found that the level in one of the calibrated vessels 57 is close to the lowest level in the calibrated vessel 56, the level in the calibrated vessel 57 corresponding to the position of the slide 64 shown by the dotted line, is determined in analogous way by the higher level, say, in the calibrated vessel 59. By selecting the proper diameter of the calibrated vessel it becomes possible to make the liquid level in one of the calibrated vessels, for example 56, be always considerably lower than the liquid level in other calibrated vessels which allows the use of the slide 64 alone, without the necessity for the additional slide 65.

After shifting the slide 64 to a new position, the resetting of the capacity of the pumps will take actually from 1 to 3 minutes, depending on the number of the pumps.

If the delivery of the working pump connected, say, with the calibrated vessel 55 has been changed due to, say, a change in the concentration of the handled component, say A, the slide 60 should be shifted along the rack 54 so as to bring the new level in the calibrated vessel 55 to the point of intersection of the element connecting the slide 60 with the slide 64 set to the lowest level in the calibrated vessel 56.

The use of the capacity regulators with the above-described control panel makes it possible in some instances to dispense with the use of a special metering unit which, in turn, allows installation of pumps handling different components in the most convenient points of the workshop and reduces the length of the pump suction and delivery pipes.

The metering accuracy of each pump provided with a capacity regulator does not depend upon the manufacturing inaccuracies of the diameter of the pump piston (or plunger) and its operating mechanism.

In describing the present embodiment of the invention the terms in their narrow sense are used for the sake of lucidity. However, the invention is not confined to the narrow sense of the terms used and it will be understood that each of said terms embraces all the equivalent elements functioning similarly and employed for the same purposes.

While a specific embodiment of the invention has been disclosed in the description, it will be understood that various modifications and changes within the spirit and the scope of the invention may occur to those skilled in the art.

These changes and modifications can be resorted to without departing from the function or scope of the invention as hereinafter defined by the appended claims.

I claim:

1. A capacity regulator for an intermittent-action displacement pump, particularly liquid-handling pump, comprising: a housing forming a regulator chamber, an elastic diaphragm located in said chamber; a variable-volume chamber formed by said diaphragm and said housing; a second elastic diaphragm likewise located in said housing of the capacity regulator; an auxiliary chamber formed by said elastic diaphragms and filled with liquid sealed hermetically by said diaphragms; a pressure-head chamber formed in said housing by said second elastic diaphragm at the side opposite to the variable-volume chamber; fixed thrust elements located in said regulator chamber and limiting the displacement of said diaphragms so that one of said diaphragms comes to bear on one of said elements in one direction of movement while the other one rests on the second of said elements in the opposite direction of movement; a control mechanism connected hydraulically with said auxiliary chamber; and a source of pressure communicating with said control mechanism.

2. A capacity regulator according to Claim 1 wherein the pressure head chamber is in communication with a source of pressure head which is higher than the pressure in the variable-volume chamber while the latter is being filled with the handled liquid.

3. A capacity regulator according to Claim 1 wherein the control mechanism comprises a source of pressure communicating with the auxiliary chamber via a bypass mechanism and building up a higher pressure than that in the pressure-head chamber.

4. A capacity regulator according to Claim 1 comprising a bypass mechanism, the control mechanism being provided with a calibrated vessel with a variable level of liquid, communicating with the auxiliary chamber via the bypass mechanism, the volume of the calibrated vessel being equal to or larger than the volume of the liquid displaced by the pump piston within one stroke.